(12) United States Patent
Jankowiak et al.

(10) Patent No.: US 8,003,020 B2
(45) Date of Patent: Aug. 23, 2011

(54) PROCESS FOR THE PREPARATION OF A SINTERED CERAMIC SPARK PLUG

(75) Inventors: Aurélien Jankowiak, Saint Etienne des Sorts (FR); Philippe Blanchart, Limoges (FR); Frédéric Trenit, Saint Michel (FR)

(73) Assignee: Meggitt (France), Paris (FR)

( * ) Notice: Subject to any disclaimer, the term of this patent is extended or adjusted under 35 U.S.C. 154(b) by 185 days.

(21) Appl. No.: 12/141,139

(22) Filed: Jun. 18, 2008

(65) Prior Publication Data

US 2009/0018008 A1 Jan. 15, 2009

(30) Foreign Application Priority Data

Jun. 18, 2007 (FR) ..................................... 07 55820

(51) Int. Cl.
*H01B 1/04* (2006.01)
*F02M 57/06* (2006.01)
*F02P 9/00* (2006.01)

(52) U.S. Cl. ...................... 252/516; 252/521.5; 313/118; 501/97.1

(58) Field of Classification Search .................. 252/516, 252/521.5; 219/270; 313/118; 501/97.1; 264/104
See application file for complete search history.

(56) References Cited

U.S. PATENT DOCUMENTS

| | | | | |
|---|---|---|---|---|
| 4,634,837 A * | 1/1987 | Ito et al. | .......................... | 219/270 |
| 5,064,789 A * | 11/1991 | Petrovic et al. | .............. | 501/96.3 |
| 5,114,888 A * | 5/1992 | Mizuno et al. | ................ | 501/97.2 |
| 5,270,919 A * | 12/1993 | Blake et al. | .................... | 370/400 |
| 5,656,219 A * | 8/1997 | Riedel et al. | ................... | 264/666 |
| 6,049,065 A * | 4/2000 | Konishi | ......................... | 219/270 |
| 6,187,706 B1 * | 2/2001 | Okabe et al. | ................. | 501/97.1 |
| 7,247,260 B2 * | 7/2007 | Collardey et al. | .......... | 252/521.1 |
| 7,727,425 B2 * | 6/2010 | Jankowiak et al. | ........ | 252/520.5 |

* cited by examiner

Primary Examiner — Mark Kopec
(74) Attorney, Agent, or Firm — Young & Thompson

(57) ABSTRACT

Process for the preparation of a ceramic wherein: 50% to 75% by weight of a compound intended to form a conductive phase, and 25% to 50% by weight of one or more materials allowing the formation of insulating phases composed of silicon nitride and modified silicon oxynitride are mixed in a receptacle containing a liquid after a thermal treatment leading to sintering of the ceramic; this mixture is subjected to grinding, drying and sieving operations; this mixture is pressed; and this mixture is sintered so as to obtain a ceramic with a porosity of between 0 and 30%. The sintering is carried out under a pressure of at least 50 bar of a gas which is inert towards the constituents of the mixture. Ceramic thus obtained and spark plug comprising it.

16 Claims, 1 Drawing Sheet

SINGLE FIGURE

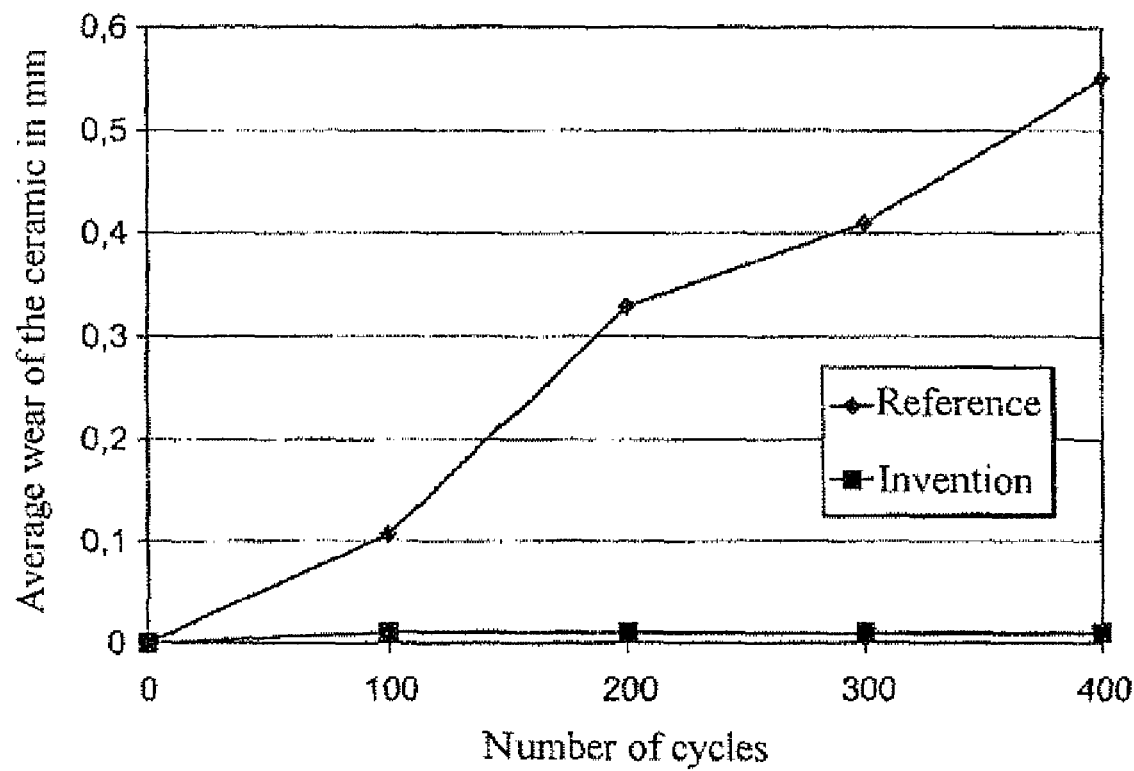
SINGLE FIGURE

US 8,003,020 B2

PROCESS FOR THE PREPARATION OF A SINTERED CERAMIC SPARK PLUG

TECHNICAL FIELD

The invention relates to the field of spark plugs, and more particularly that of semiconductor ceramics used in the manufacture of high-energy low-voltage spark plugs.

BACKGROUND OF THE INVENTION

It is known that spark plugs, in particular for gas turbines and jet engines, may be of two types:
high-energy high-voltage (HEHV) spark plugs, of which the operating voltage is approximately 20 kV;
high-energy low-voltage (HELV) spark plugs, of which the operating voltage is approximately 2 to 3 kV; these are capable of providing energy of some tenths of a Joule to several Joules.

HELV spark plugs comprise a material such as a cermet between their electrodes, so that the application of a sufficient voltage between these electrodes results in the passage of a spark.

The behavior of the material during the different phases of the spark has been analyzed as being as follows:

Firstly, the cermet is active during the ionization phase which corresponds to an accumulation of charges on the surface of the material. Then comes the arcing phase which corresponds to an intermediate zone during which there is a step-by-step propagation of micro-arcs on the said surface. Lastly comes the sparking phase during which the semiconductor is inactive but undergoes considerable mechanical and thermal stress caused by the passage of the spark.

It will be noted that in the everyday language of spark plug manufacturers, this material is sometimes described as a "semiconductor". However, this practice does not truly correspond to actual fact. Indeed, during the arcing phase, the material becomes a conductor on its surface, but not throughout its entire volume.

The advantages of HELV spark plugs are linked, on the one hand, with their operation which depends little on the conditions existing in the combustion chamber (re-ignition under high pressure) and, on the other hand, with the shorter ignition chain which must be created in order to ensure their operation. These are the advantages which have led to the development of silicon carbide-based ceramic materials described in particular in documents U.S. Pat. No. 5,028,346 and FR-A-2 346 881. These materials also include an insulating phase based, for example, on silicon nitride and modified silicon ox nitride, or silica, alumina and alkaline-earth oxide.

However, if these systems have not been generally adopted on engines, it is because the lifetime of a spark plug comprising these materials becomes very short if used under harsh conditions, namely at high pressures and high temperatures combined with chemical attacks linked to the type of fuel used.

In HEHV spark plugs, it is the wear of the electrodes which limits the lifetime of the spark plugs whereas in HELV spark plugs, the ceramic wears out substantially before the electrodes, and it is this that limits their lifetime.

The object of the invention is to increase the lifetime, and therefore the reliability, of HELV spark plugs.

BRIEF SUMMARY OF THE INVENTION

For this purpose, the invention relates to a process for the preparation of a ceramic wherein:

50% to 75% by weight of a compound intended to form a conductive phase, and 25% to 50% by weight of at least one material allowing the formation of insulating phases composed of silicon nitride and modified silicon ox nitride are mixed in a receptacle containing a liquid after a thermal treatment leading to sintering of the ceramic;

this mixture is subjected to grinding, drying and sieving operations;

this mixture is pressed;

and this mixture is sintered so as to obtain a ceramic with a porosity of between 0 and 30%, wherein the sintering is carried out under a pressure of at least 50 bar of a gas which is inert towards the constituents of the mixture.

Preferably, the said inert gas is nitrogen,

Preferably, the pressure is at least 80 bar.

The conductive phase may be selected from SiC and $MoSi_2$ and mixtures thereof.

Preferably, the mixture is made of compounds and sintering is carried out so as to obtain a free silicon nitride content of 15 to 22% in the final ceramic.

The porosity of the ceramic obtained is preferably between 0% and 15%.

3% to 10% by weight, based on the total mass of the compounds intended to form the conductive and insulating phases, of at least one compound selected from the group consisting of binding and plasticizing organic compounds may be added to this mixture, and after pressing and before sintering a binder-removing operation is carried out.

Grinding can then be carried out in two stages; the addition of the plasticizer takes place between the two stages, and the second grinding stage is less vigorous than the first.

The said at least one material allowing the formation of the insulating phases may be selected from the group consisting of:

$Si_3N_4$, $Al_2O_3$, MgO, CaO and the rare earth oxides such as $Y_2O_3$.

The invention also relates to a sintered ceramic, wherein it is obtained by the foregoing process.

The conductive phase may be selected from the group consisting of SiC, $MoSi_2$, and mixtures thereof.

The insulating phase may comprise a silicon nitride and modified silicon ox nitrides such as one selected from the group consisting of M Si M'ON and M SiM'M"ON with:

M selected from Ca, Mg, Sr

M' and M" selected from Al, Y, Pr, Nd, La.

The invention also relates to a high-energy low-voltage spark plug comprising a ceramic between its electrodes, wherein the said ceramic is of the foregoing type.

As will have been understood, the invention consists in first using the insulating phases comprising silicon nitride and modified silicon ox nitride obtained by sintering at a high gas pressure (the "gas pressure sintering" or GPS process) in order to ensure a good density and a good stability of the materials obtained. The phases comprising ceramics have very good mechanical and thermo-mechanical properties. Furthermore, their very high electrical resistivity, combined with their high dielectric rigidity, means that they can be used in the field of applications envisaged.

Thus, the ceramic element located between the electrodes of the spark plug can resist the high stresses that it is subjected to during the ionization phase (high pressure, high temperature, presence of chemical agents) and also during the spark phase when the semiconductor is passive but is subjected to thermal and mechanical shocks. These lead to exposure of the particles of the conductive phase located near the electrode interface, in the case of HELV spark plugs using ceramics known in the art, manufactured from starting materials of a relatively similar nature to those of the present invention, but which have not been produced by using the GPS process. The result of the process of the invention is to obtain ceramics that are distinguished from the prior art by a better-controlled microstructure which is less likely to have defects and where the Si nitride has usually reacted more vigorously with the other compounds forming the insulating phase.

A clearer understanding of the invention will emerge from the following description, given with reference to the accompanying single FIGURE.

BRIEF DESCRIPTION OF THE DRAWING

The FIGURE shows the average wear in mm over time (expressed in number of starting cycles: 30 s ON-30 s OFF under kerosene drip) of a reference ceramic and a ceramic of the invention when they are used in a HELV spark plug during a test under kerosene drip at a frequency of 2 Hz with a stored energy of 3.3 J.

DETAILED DESCRIPTION OF THE INVENTION

Preferred examples of conductive phases that can be used within the scope of the invention may include SiC and $MoSi_2$ which have excellent thermo mechanical properties. SiC has excellent resistance to oxidation, in particular at temperatures of approximately 650° C. It will be observed that $MoSi_2$ tends to oxidize markedly between 300° C. and 700° C. to form silica and $MoO_3$, of which the mesh volume is much higher than that of $MoSi_2$, which in the long term results in cracking of the parts. But this phenomenon does not occur at very high temperatures (1,100° C. and above), because the protective layer of silica formed prevents the abrupt formation of $MoO_3$.

The insulating phase comprises one or more modified silicon ox nitrides obtained during sintering from, for example, $Si_3N_4$, $Y_2O_3$ and MgO, and from free $Si_3N_4$ representing a portion of the $Si_3N_4$ initially present in the pure state in the mixture, and which has not reacted with the oxides during sintering by the GPS process.

Generally speaking, these modified silicon ox nitrides have the general formula M Si M'ON or M Si M' M"ON with:
M selected from Ca, Mg, Sr
M' and M" selected from Al, Y, Pr, Nd, La.

The above-mentioned compounds allow the formation of phases ensuring optimum densification and giving the ceramic great hardness and good mechanical and thermo mechanical properties. The porosity of the ceramic obtained must not exceed 30%, preferably 15%, in order to ensure good mechanical strength of the part and to limit risks of perforation thereof by the electric arc.

The respective proportions of the various essential compounds are, in percentages by weight, based on the total solid matter remaining in the final ceramic:
50% to 75% for the materials comprising the conductive phase;
25% to 50% for the materials comprising the insulating phase which are one or more Si ox nitrides or free Si nitride, so remain in the uncombined state; preferably, this modified free Si nitride represents between 15 and 22% of the total mass of the compounds comprising the insulating and conductive phases of the ceramic.

Compounds making it easier to obtain a ceramic with the desired morphology, but not intended to exist as such in the final product, may be used during preparation. In particular, dispersants, binders and plasticizers may be used. Dispersants may be present in a proportion of up to 1% by weight based on the two classes of compounds comprising the conductive and insulating phases, and plasticizers and binders in a proportion of, for example, 3% to 10% by weight based on the compounds comprising the conductive and insulating phases. The binders and plasticizers must not contain alkalis or alkaline earths, and must be purely organic so as not to pollute the basic composition.

As a non-limiting example of the process for the preparation of ceramics according to the invention, the following procedure may be applied:

During a first stage, the compounds in the form of powders are mixed, preferably in two sub-stages.

In the first sub-stage, 35 g of $Si_3N_4$ alpha, 3 g of $Al_2O_3$, 5 g of $Y_2O_3$ and 1 g of MgO are poured into a jar. The jar contains 10 grinding media measuring about 13 mm in diameter, 22 g of osmosized water, 0.3 g of DARVAN C or A88 (5R,6R-2,4-bis-(4-hydroxy-3-methoxybenzyl)-1,5-dibenzyl-oxo-6-hydroxy-1,2,4-triazacycloheptane) or DOLAPIX PC33. These compounds are dispersants. Other liquid media apart from water may be used, such as alcohol, but in the latter case other dispersants must be used (such as BEYCOSTAT C213 which is a phosphoric ester), those mentioned above being incompatible with alcohol.

The mixture is then ground at a relatively high speed, by placing the jar in a planetary centrifuge for 45 minutes. The object is to break down any agglomerates of powder and to thoroughly disperse the matrix. A ball mill could be used but it would take longer to obtain a homogeneous mixture (about 4 hours).

In a second sub-stage, 56 g of silicon carbide SiC with an average particle size of 10 µm is added to the jar, together with a solution containing 27 g of osmosized water, 7 g of PEG 600 and 1 g of ESACOL HS26. PEG 600 is a polyethylene glycol. This compound is a plasticizer which facilitates the final pressing stage. ESACOL HS26 is a guar gum-based binder. The jar is then placed back inside the centrifuge and grinding occurs at a moderate speed for 20 minutes so as not to damage the plasticizers. Over-energetic grinding would break the polymer chains which give the products their resilient properties. It is for this reason too that the plasticizers are not introduced into the mixture until after the first stage of grinding since said stage is energetic.

The mixture obtained is then dried in an oven at 70° C. for 24 hours to remove the water from the mixture.

The cake thus obtained is ground with the aid of a mortar. The powder obtained is sieved using a 500 µm sieve.

The powder that has passed through the sieve undergoes a two-stage pressing operation: single-axis pressing in a 13 mm-diameter mould to obtain a preform, then isostatic pressing in an enclosure at 2000 bar.

The binder is then removed from the preforms under pure argon or under vacuum at a temperature of at most 600° C. for 3 days, in order to burn off the organic additives present in the preforms.

The following binder-removal cycle is adopted:
Increase at 0.2° C./min up to 600° C.
Plateau of 5 hours at 600° C.
Decrease at 10° C./min.

Lastly, the preforms from which the binder has been removed are placed in a graphite crucible to be sintered therein at between 1650 and 1950° C. for a period ranging from 30 minutes to 2 hours under a controlled atmosphere and under the pressure of argon or nitrogen, preferably nitrogen. This pressure is at least 50 bar, preferably at least 80 bar, with an upper limit imposed solely by the construction of the installation. Usually the working pressure is 80 to 120 bar.

According to the invention, the GPS process is therefore adopted in a pressurized atmosphere.

This process consists in sintering in the presence of a pressurized gas which is inert towards the compounds in question, making argon or nitrogen the preferred choice. Based on sintering carried out conventionally under a low gas pressure, the GPS process allows sintering to be conducted at high temperature over a long period of time, avoiding a decomposition of the ceramic being sintered. Specifically, in the case of sintering Si nitride and Si ox nitride compounds such as those used or formed during the manufacture of ceramics according to the invention, using a high nitrogen pressure makes avoiding their decomposition more certain. The use of nitrogen will therefore generally be preferred to that of argon (or other inert gases) in implementing the invention.

The GPS process is applied by placing a bed of Si nitride powder in a crucible and around the preforms. The Si nitride could be replaced in particular by another nitride which is sparingly reactive toward the $Si_3N_4$ of the preforms, such as BN or AlN. The bed of powder makes it possible to separate the preforms, if there are several of them in the same crucible, and also allows a more even diffusion of the pressurized nitrogen atmosphere. Said atmosphere is therefore homogeneous around the preforms.

This technique promotes the reduction in the size and number of defects in the microstructure of the materials, in particular porosities, which reduces their fragility. The pores of the material act like critical defects from the electrical point of view and locally increase the electrical field in the vicinity thereof. Generally speaking, owing to the GPS technique, a better control of the microstructure and defects present is achieved. Poorly-controlled porosity, or the presence of macro-defects, can increase the possibility of piercing of the ceramic in the event of electrical stress in an extreme environment.

The lifetime of the materials in service is thus increased when they are subjected to high temperatures and rapid variations in temperature by a reduction in the erosion of the surface located between the electrodes, under the effect of the energy created locally by the high-energy spark, in particular in the presence of kerosene and under high pressure. Equally, the mechanical and thermo-mechanical properties of the material are improved, which is thought may attribute in particular to the possibility of obtaining a more marked reaction of the Si nitride with the oxides forming the remainder of the insulating phase which generally results in a lower free Si nitride content of the ceramic on completing sintering. From this point of view, it is in particular the increase in the strength of the ceramic which is advantageous, in that it reduces the impact of the acoustic shock of the electric arc. Cracking of the ceramic by fatigue and erosion is thus attenuated.

The following sintering cycle is adopted in this example:
Increase at 10° C./min up to 1800° C.
Plateau of 60 min at 1800° C. under 100 bar of $N_2$
Decrease at 10° C./min up to 20° C.

According to the invention, a ceramic is obtained containing SIC, free $Si_3N_4$ and one or more of the following compounds: Mg—SiYAlON, Mg—SiYON, and Mg—SiAlON or others, belonging to the $Y_2O_3$—$Al_2O_3$—$Si_3N_4$ diagram, and total porosity (open and closed) of at most 25%, resulting from the combination of part of the $Si_3N_4$ initially present with the oxides introduced into the mixture.

In the precise example that has just been described, the ceramic obtained has the following composition and morphology:
SiC=56%;
free or modified $Si_3N_4$ 35%; 20% of which is free $Si_3N_4$, the remainder being combined at 1% MgO, 3% $Al_2O_3$ and 5% $Y_2O_3$ to form modified Si oxynitrides;
porosity <25%.

It must be understood that the details of the procedures for obtaining ceramics according to the invention may differ from the examples which have been described. The important point is that in the end, a ceramic having the required composition and porosities is obtained. In particular, passing from single-axis pressing without performing isostatic pressing of the powder can be envisaged. But using two stages achieves better homogeneity of the parts in terms of density. If isostatic pressing only is adopted, the use of binders and plasticizers with contents located at the top of the above-mentioned 3% to 10% range is recommended.

The single FIGURE shows the experimental results obtained during the kerosene drip tests.

Two spark plugs are used. The first is fitted, between its electrodes, with a reference ceramic representative of the prior art according to document U.S. Pat. No. 5,028,346, and including silicon carbide, silicon nitride and a modified silicon ox nitride. It contains 54% to 65% SiC, 29% to 40% free silicon nitride and 8% to 22% modified silicon ox nitride. The second is fitted with a ceramic according to the invention, and prepared according to the process described in the above-mentioned example.

The stored energy is 3.3 J, the frequency of the kerosene drips reaching the surface of the spark plug is 2 Hz. The frequency of the pulses is 6 Hz. The spark voltage of the two spark plugs is between 600 V and 900 V.

The single FIGURE shows the depth of average wear of the ceramic based on the peripheral electrode (expressed in mm), as a function of time, expressed in number of start cycles. It will be observed that the measured wear of the semiconductor ceramic of the prior art is considerably higher than that measured on the semiconductor ceramic according to the invention, the latter being almost zero even after 400 start cycles.

The invention claimed is:
1. Process for the preparation of a ceramic wherein:
50% to 75% by weight of a compound intended to form a conductive phase, and 25% to 50% by weight of at least material allowing the formation of insulating phases composed of silicon nitride and modified silicon oxynitride are mixed in a receptacle containing a liquid after a thermal treatment leading to sintering of the ceramic;
this mixture is subjected to grinding, drying and sieving operations;
this mixture is pressed;
and this mixture is sintered so as to obtain a ceramic with a porosity of between 0 and 30%,
wherein the sintering is carried out under a pressure of at least 50 bar of a gas which is inert towards the constituents of the mixture.

2. Process according to claim 1, wherein the said inert gas is nitrogen.

3. Process according to claim 2, wherein the pressure is at least 80 bar.

4. Process according to claim 3, wherein the mixture is made of compounds and sintering is carried out so as to obtain a free silicon nitride content of 15 to 22% in the final ceramic.

5. Process according to claim 2, wherein the conductive phase is selected from SiC and $MoSi_2$ and mixtures thereof.

6. Process according to claim 5, wherein the mixture is made of compounds and sintering is carried out so as to obtain a free silicon nitride content of 15 to 22% in the final ceramic.

7. Process according to claim 2, wherein the mixture is made of compounds and sintering is carried out so as to obtain a free silicon nitride content of 15 to 22% in the final ceramic.

8. Process according to claim 1, wherein the pressure is at least 80 bar.

9. Process according to claim 8, wherein the mixture is made of compounds and sintering is carried out so as to obtain a free silicon nitride content of 15 to 22% in the final ceramic.

10. Process according to claim 1, wherein the conductive phase is selected from SiC and $MoSi_2$ and mixtures thereof.

11. Process according to claim 10, wherein the mixture is made of compounds and sintering is carried out so as to obtain a free silicon nitride content of 15 to 22% in the final ceramic.

12. Process according to claim 1, wherein the mixture is made of compounds and sintering is carried out so as to obtain a free silicon nitride content of 15 to 22% in the final ceramic.

13. Process according to claim 1, wherein the porosity of the ceramic obtained is between 0% and 15%.

14. Process according to claim 1, wherein 3% to 10% by weight, based on the total mass of the compounds intended to form the conductive and insulating phases, of at least one compound selected from the group consisting of binding and plasticizing organic compounds, are added to this mixture and in that after pressing and before sintering a binder-removing operation is carried out.

15. Process according to claim 14, wherein grinding is carried out in two stages, in that the addition of the plasticizer takes place between the two stages, and in that the second grinding stage is less energetic than the first.

16. Process according to claim 1, wherein the said at least one material allowing the formation of the insulating phases is selected from the group consisting of: $Si_3N_4$, $Al_2O_3$, MgO, CaO and the rare-earth oxides such as $Y_2O_3$.

* * * * *